Figure 1:
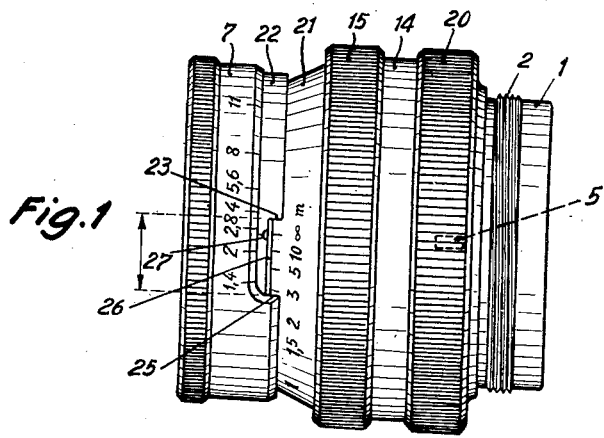

Jan. 2, 1951  F. HINDEN  2,536,500

MOUNT FOR PHOTOGRAPHIC OBJECTIVES

Filed April 22, 1948

INVENTOR
FRITZ HINDEN
BY
ATTORNEY

Patented Jan. 2, 1951

2,536,500

UNITED STATES PATENT OFFICE 2,536,500

MOUNT FOR PHOTOGRAPHIC OBJECTIVES

Fritz Hinden, Aarau, Switzerland

Application April 22, 1948, Serial No. 22,521
In Switzerland March 12, 1948

6 Claims. (Cl. 88—57)

Geometrical optics teaches us that an axial vertical plane through a system of lenses can again be copied only in an axial vertical plane. The distances of these two planes from the photographing system of lenses are determined by the known formula $$\frac{1}{f} = \frac{1}{a} + \frac{1}{b}$$

in which $f$ is the focal length of the photographing system of lenses, $a$ is the distance of the plane to be photographed from the system of lenses in the object space and $b$ is the distance of the photographed plane from the system of lenses in the image space. It is clear from the formula mentioned that it is impossible to photograph clearly in a single plane at the same time two planes which are at different distances from the system of lenses. However, if one dispenses with an exact point-for-point combination of rays in the image space and contents oneself, for the photographing, with a circle which appears to be point-for-point to the naked eye and which is called a dispersion circle, axial vertical photographing planes, which lie slightly in front of or behind the mathematically determined photographing plane, can still be employed. The distance of these photographing planes in front of and behind the exactly determined photographing plane is called the photographing depth. It is dependent upon the size of the tolerated dispersion circle and upon the diaphragm aperture of the photographing system of lenses. Corresponding to these two boundary planes of the photographing depth, which are still tolerated as sufficiently sharp, are two planes on the other side of the photographing system of lenses, i. e., in the object space, the position of these last mentioned two planes being exactly determinable by the foregoing formula. The region between these two boundary planes in the object space is termed "depth-sharpness" region. This depth-sharpness region is, therefore, again dependent only upon the tolerated dispersion circle in the image space and upon the diaphragm aperture of the photographing system of lenses.

Geometrical optics shows that the two boundary planes of the depth-sharpness region in the object space are not symmetrical to the adjustment plane but are at considerably different distances therefrom. The adjustment plane in the object space is the plane which, according to the foregoing formula, corresponds to the image plane which lies in the image space, i. e., the plane of the plate or film. The known means, such as formulae, tables, scale discs and special devices on the mounts of the objectives, for the determination of the depth-sharpness region, always give the boundaries of the depth-sharpness region for a definite adjustment plane or distance adjustment and the selected diaphragm aperture. Now, for many cases, it is desirable to adjust one boundary of the depth-sharpness region instead of the adjustment distance on the distance scale and to read the other boundary of the depth-sharpness region. This is rendered possible by the present invention.

The subject matter of the present invention is a mount for photographic objectives with a diaphragm ring and a distance ring, in which a sleeve-shaped sliding member is carried axially displaceably in a carrying ring but is secured against rotation therein, which sliding member is mounted in such a manner on a distance ring screwed on a screw thread of the carrying ring that, on rotation of the distance ring, it is displaced axially, and, on its front end, there is mounted a ring with a diaphragm mark, which ring has, on the distance scale that is arranged on the front end of the distance ring, a reading or adjustment mark that indicates the distance of one boundary plane of the depth-sharpness region, and in which there is screwed, into a screw thread of the sliding member, a diaphragm ring in which the objective is mounted and which has, on its front part, the diaphragm scale and a reading or adjustment mark which indicates, on the distance scale, the distance of the other boundary plane of the depth-sharpness region, in which diaphragm ring the casing with the laminae of an iris diaphragm is fixed, whilst the diaphragm-groove ring of this iris diaphragm is rotatably mounted in the diaphragm ring and is secured against rotation in relation to the sliding member, so that, on rotation of the diaphragm ring, the aperture of the iris diaphragm is altered and the objective mounted in the diaphragm ring undergoes an axial displacement, the axial displacement of the objective and the alteration of the aperture of the iris diaphragm being so adjusted in relation to each other that, notwithstanding the alteration of the depth-sharpness thus occasioned, the position of one boundary plane of the depth-sharpness region remains unaltered.

Figure 2:
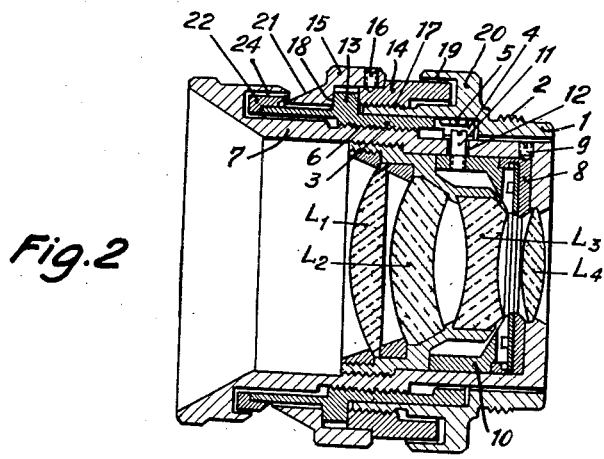
Figure 3:
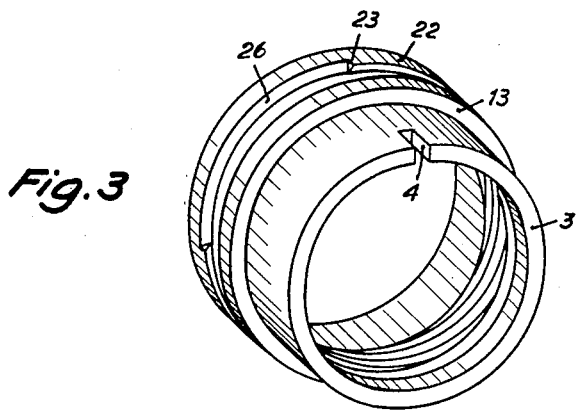

An example of embodiment of the subject matter of the invention is represented in the accompanying drawings, of which Fig. 1 is a plan of a mount for photographic objectives with a diaphragm ring and a distance ring;

Fig. 2 is an axial section through this mount with the objective mounted therein; and Fig. 3 is a diagrammatic representation of a detail of this mount.

1 denotes the carrying ring which has, on its rear part, a screw thread 2 for fixing the mount on the apparatus. Carried axially displaceably in this carrying ring 1 is a sleeve-shaped sliding member 3 which, at its rear end, has a longitudinal slot 4 in which there engages a projection 5 on the inside of the carrying ring 1 and which prevents the sliding member from rotating. The sliding member 3 has an internal screw thread 6 in which there is screwed a diaphragm ring 7 in which the lenses $L_1$, $L_2$, $L_3$ and $L_4$ of the objective are mounted. In the rear part of this diaphragm ring 7 there is inserted the casing 8 of an iris diaphragm which is held therein unrotatably by means of at least one screw 9. In front of this casing 8 there is rotatably mounted in the diaphragm ring 7 the diaphragm-groove ring 10 of this iris diaphragm, which diaphragm-groove ring is prevented, on rotation of the diaphragm ring 7, from rotating with the latter by means of a radial stud 11 which is screwed therein and passes through a transverse slot 12 on the periphery of the diaphragm ring 7 and which engages in the longitudinal slot 4 of the sliding member 3. The sliding member 3 has, on its periphery, a bead 13 which is engaged by a distance ring that is formed of two rings 14 and 15 which are rigidly connected together by screws 16. This bead 13 of the sliding member 3 lies between the front end of the ring 14, which is screwed on to a screw thread 17 on the front end of the carrying ring 1, and a shoulder 18 inside the ring 15, so that it is displaced axially on rotation of the rings 14 and 15 that are connected together. The rear end of the ring 14 lies covered up in an annular groove 19 of an annular bead 20 of the carrying ring 1. The ring 15 has, in front, a conical surface 21 which bears the distance scale. On the front end of the sliding member 3 there is fixed a ring 22 which extends over the conical surface 21 that bears the distance scale and which has, on its rear end, a recess which is bounded on one side by a reading or adjusting edge 23 for the distance scale and within which a diaphragm mark is provided. This ring 22 lies in an annular groove 24, which is open at the back, in the front widened part of the diaphragm ring 7. The outer wall of this annular groove 24, which overlaps the conical surface 21, has, at its rear edge, a recess which is bounded on one side by a reading or adjusting edge 25. The diaphragm scale is put on this recess in the outer wall of the annular groove 24.

The two reading or setting edges 23 and 25 cut out a section of the distance scale, the reading or adjusting edge 23 indicating the more distant boundary of the depth-sharpness region and the reading or setting edge 25 indicating the nearer boundary of the depth-sharpness region. This section of the distance scale which is cut out of the distance scale and indicates the set depth-sharpness region is advantageously made prominent by providing, on the recess of the ring 22, a white edge 26 which is visible up to the reading or adjusting edge 25.

In order to facilitate the adjustment and reading still further, the word "distant" or some other corresponding indication may be engraved next to the reading or adjusting edge 23 and the word "near" or some other corresponding indication may be engraved next to the reading or adjusting edge 25.

Naturally, it would also be possible to provide index strokes instead of the reading or adjusting edges 23 and 25.

Now, it is extremely important that the pitch of the screw thread 6, into which the diaphragm ring 7 is screwed, and the construction of the iris diaphragm, the casing of which is denoted by 8, and its diaphragm-groove ring 10, should be brought into agreement with each other in such a manner that the set distance of the objective that is mounted in the diaphragm ring 7 should be so altered on the rotation of the latter that, notwithstanding the alteration, thus occasioned, of the depth-sharpness region, one of its set boundary planes, in the case represented the more distant plane, should remain unaltered. Obviously, the mount could also be so constructed that, instead of the more distant boundary plane, the nearer boundary plane of the depth-sharpness region would remain unaltered on the rotation of the diaphragm ring.

Now, if, for example, a number of objects which are at different distances from the photographing objective are to be photographed in a single photograph, the distance of the remotest object from the photographing objective being, for example, 10 metres, and the diaphragm aperture being $f{:}4$, the distance ring 14, 15 is rotated so that the reading or adjusting edge 23 of the ring 22 lies on the graduation, which indicates the distance of 10 metres, of the distance scale put on the conical surface 21 of the ring 15, and then, by rotating the diaphragm ring 7, the graduation marked "4" of the diaphragm scale is brought on to the diaphragm mark 27 on the recess of the ring 22. The reading or adjusting edge 25 of the diaphragm ring 7 then indicates, on the distance scale on the conical surface 21 of the ring 15, 1.60 metres for example, i. e., all the objects, which lie at a distance of between 1.60 metres and 10 metres from the photographing objective, are photographed on the plate or film with the haziness occasioned by the tolerated dispersion circle. If, in another case, there is set, for example, the problem of photographing simultaneously a number of objects which are at a distance of from 1 metre to 5 metres from the photographing objective, the diaphragm aperture necessary for this purpose is adjusted in such a manner that first the reading or adjusting edge 23 is set to the graduation, which indicates 5 metres, of the distance scale on the conical surface 21 of the ring 15 and then the reading or adjusting edge 25 of the diaphragm ring 3 is set to the graduation, which indicates 1 metre, of this distance scale. In this way, the necessary diaphragm aperture is already adjusted and it can now be read on the diaphragm scale at the diaphragm mark 27 of the ring 22. In both cases, it is unnecessary to adjust the set distance of the photographing objective separately.

What I claim is:

1. A mount for a photographic objective, said mount comprising an externally screw-threaded carrying ring, a distance ring screwed on the screw thread of said carrying ring, a sleeve-shaped, internally screw-threaded sliding member carried axially displaceably but unrotatably in said carrying ring and mounted on said distance ring and adapted, on rotation of said distance ring, to be displaced axially, a diaphragm-mark ring bearing a diaphragm mark and mounted on the front end of said sliding member, a distance scale arranged on the front end of said distance ring, said diaphragm-mark ring having, on said distance scale, an indicating mark for indicating the distance of one boundary plane of the depth-sharpness region, a diaphragm ring screwed into said screw thread of said sliding member, the objective being mounted in said diaphragm ring, said diaphragm ring having, on its front part, a diaphragm scale and an indicating mark for indicating, on the distance scale, the distance of the other boundary plane of the depth-sharpness region, an iris diaphragm, and a casing, with the laminae of said iris diaphragm, fixed in said diaphragm ring, said iris diaphragm having a diaphragm-groove ring, said diaphragm-groove ring being rotatably mounted in said diaphragm ring and unrotatable in relation to said sliding member, the aperture of said iris diaphragm being altered and said objective undergoing an axial displacement on rotation of said diaphragm ring and the axial displacement of said objective and the alteration of the aperture of said iris diaphragm being so adjusted in relation to each other that the position of one boundary plane of the depth-sharpness region remains unaltered notwithstanding the alteration, thus produced, of the depth-sharpness region.

2. A mount for a photographic objective, said mount comprising an externally screw-threaded carrying ring, a distance ring screwed on the screw thread of said carrying ring, a sleeve-shaped, internally screw-threaded sliding member carried axially displaceably but unrotatably in said carrying ring and mounted on said distance ring and adapted, on rotation of said distance ring, to be displaced axially, a diaphragm-mark ring bearing a diaphragm mark and mounted on the front end of said sliding member, a distance scale arranged on the front end of said distance ring, said diaphragm-mark ring having, on said distance scale, an indicating mark for indicating the distance of one boundary plane of the depth-sharpness region, a diaphragm ring screwed into said screw thread of said sliding member, the objective being mounted in said diaphragm ring, said diaphragm ring having, on its front part, a diaphragm scale and an indicating mark for indicating, on the distance scale, the distance of the other boundary plane of the depth-sharpness region, an iris diaphragm, and a casing, with the laminae of said iris diaphragm, fixed in said diaphragm ring, said iris diaphragm having a diaphragm-groove ring, said diaphragm-groove ring being rotatably mounted in said diaphragm ring and unrotatable in relation to said sliding member, the aperture of said iris diaphragm being altered and said objective undergoing an axial displacement on rotation of said diaphragm ring and the axial displacement of said objective and the alteration of the aperture of said iris diaphragm being so adjusted in relation to each other that the position of one boundary plane of the depth-sharpness region remains unaltered notwithstanding the alteration, thus produced, of the depth-sharpness region, said sliding member having a longitudinal slot at its rear end, a projection on said carrying ring and engaging in said slot and preventing the rotation of said sliding member in said carrying ring, a stud screwed radially into said diaphragm-groove ring, said diaphragm ring having a transverse slot on its periphery and said stud passing through said transverse slot and preventing said diaphragm-groove ring from rotating with said diaphragm ring.

3. A mount for a photographic objective, said mount comprising an externally screw-threaded carrying ring, a distance ring screwed on the screw thread of said carrying ring, a sleeve-shaped, internally screw-threaded sliding member carried axially displaceably but unrotatably in said carrying ring and mounted on said distance ring and adapted, on rotation of said distance ring, to be displaced axially, a diaphragm-mark ring bearing a diaphragm mark and mounted on the front end of said sliding member, a distance scale arranged on the front end of said distance ring, said diaphragm-mark ring having, on said distance scale, an indicating mark for indicating the distance of one boundary plane of the depth-sharpness region, a diaphragm ring screwed into said screw thread of said sliding member, the objective being mounted in said diaphragm ring, said diaphragm ring having, on its front part, a diaphragm scale and an indicating mark for indicating, on the distance scale, the distance of the other boundary plane of the depth-sharpness region, an iris diaphragm, and a casing, with the laminae of said iris diaphragm, fixed in said diaphragm ring, said iris diaphragm having a diaphragm-groove ring, said diaphragm-groove ring being rotatably mounted in said diaphragm ring and unrotatable in relation to said sliding member, the aperture of said iris diaphragm being altered and said objective undergoing an axial displacement on rotation of said diaphragm ring and the axial displacement of said objective and the alteration of the aperture of said iris diaphragm being so adjusted in relation to each other that the position of one boundary plane of the depth-sharpness region remains unaltered notwithstanding the alteration, thus produced, of the depth-sharpness region, said sliding member having a longitudinal slot at its rear end, a projection on said carrying ring and engaging in said slot and preventing the rotation of said sliding member in said carrying ring, a stud screwed radially into said diaphragm-groove ring, said diaphragm ring having a transverse slot on its periphery and said stud passing through said transverse slot and preventing said diaphragm-groove ring from rotating with said diaphragm ring, said distance ring having on its front end a conical surface bearing the distance scale, the rear end of said diaphragm-mark ring overlapping said conical surface and having a recess and, on one side of said recess, an edge which serves, on the distance scale, as an indicating mark for one boundary plane of the depth-sharpness region, said diaphragm ring having a widened front part and a rearwardly open annular groove in said widened front part and said diaphragm-mark ring lying in said annular groove, the outer wall of said annular groove having, on its rear edge that overlaps said distance-scale bearing conical surface on the front end of said distance ring, a recess on which the diaphragm scale is put and which is bounded on one side by an edge which serves as an indicating mark, on the distance scale, for the other boundary plane of the depth-sharpness region.

4. A mount for a photographic objective, said mount comprising an externally screw-threaded carrying ring, a distance ring screwed on the screw thread of said carrying ring, said distance ring being formed of two ring parts connected together by screws, a sliding sleeve-shaped internally screw-threaded sliding member, an annular bead on the outer surface of said sliding member and surrounded by the said two ring parts, said sliding member being displaced axially on screwing said distance ring on said carrying ring, a diaphragm-mark ring bearing a diaphragm mark and mounted on the front end of said sliding member, a distance scale arranged on the front end of said distance ring, said diaphragm-mark ring having, on said distance scale, an indicating mark for indicating the distance of one boundary plane of the depth-sharpness region, a diaphragm ring screwed into said screw thread of said sliding member, the objective being mounted in said diaphragm ring, said diaphragm ring having, on its front part, a diaphragm scale and an indicating mark for indicating, on the distance scale, the distance of the other boundary plane of the depth-sharpness region, an iris diaphragm, and a casing, with the laminae of said iris diaphragm, fixed in said diaphragm ring, said iris diaphragm having a diaphragm-groove ring, said diaphragm-groove ring being rotatably mounted in said diaphragm ring and unrotatable in relation to said sliding member, the aperture of said iris diaphragm being altered and said objective undergoing an axial displacement on rotation of said diaphragm ring and the axial displacement of said objective and the alteration of the aperture of said iris diaphragm being so adjusted in relation to each other that the position of one boundary plane of the depth-sharpness region remains unaltered notwithstanding the alteration, thus produced, of the depth-sharpness region.

5. A mount for a photographic objective, said mount comprising an externally screw-threaded carrying ring, a distance ring screwed on the screw thread of said carrying ring, said distance ring being formed of two ring parts connected together by screws, a sliding sleeve-shaped internally screw-threaded sliding member, an annular bead on the outer surface of said sliding member and surrounded by the said two ring parts, said sliding member being displaced axially on screwing said distance ring on said carrying ring, a diaphragm-mark ring bearing a diaphragm mark and mounted on the front end of said sliding member, a distance scale arranged on the front end of said distance ring, said diaphragm-mark ring having, on said distance scale, an indicating mark for indicating the distance of one boundary plane of the depth-sharpness region, a diaphragm ring screwed into said screw thread of said sliding member, the objective being mounted in said diaphragm ring, said diaphragm ring having, on its front part, a diaphragm scale and an indicating mark for indicating, on the distance scale, the distance of the other boundary plane of the depth-sharpness region, an iris diaphragm, and a casing, with the laminae of said iris diaphragm, fixed in said diaphragm ring, said iris diaphragm having a diaphragm-groove ring, said diaphragm-groove ring being rotatably mounted in said diaphragm ring and unrotatable in relation to said sliding member, the aperture of said iris diaphragm being altered and said objective undergoing an axial displacement on rotation of said diaphragm ring and the axial displacement of said objective and the alteration of the aperture of said iris diaphragm being so adjusted in relation to each other that the position of one boundary plane of the depth-sharpness region remains unaltered notwithstanding the alteration, thus produced, of the depth-sharpness region, said sliding member having a longitudinal slot at its rear end, a projection on said carrying ring and engaging in said slot and preventing the rotation of said sliding member on said carrying ring, a stud screwed radially into said diaphragm-groove ring, said diaphragm ring having a transverse slot on its periphery and said stud passing through said transverse slot and preventing said diaphragm-groove ring from rotating with said diaphragm ring.

6. A mount for a photographic objective, said mount comprising an externally screw-threaded carrying ring, a distance ring screwed on the screw thread of said carrying ring, said distance ring being formed of two ring parts connected together by screws, a sliding sleeve-shaped internally screw-threaded sliding member, an annular bead on the outer surface of said sliding member and surrounded by the said two ring parts, said sliding member being displaced axially on screwing said distance ring on said carrying ring, a diaphragm-mark ring bearing a diaphragm mark and mounted on the front end of said sliding member, a distance scale arranged on the front end of said distance ring, said diaphragm-mark ring having, on said distance scale, an indicating mark for indicating the distance of one boundary plane of the depth-sharpness region, a diaphragm ring screwed into said screw thread of said sliding member, the objective being mounted in said diaphragm ring, said diaphragm ring having, on its front part, a diaphragm scale and an indicating mark for indicating, on the distance scale, the distance of the other boundary plane of the depth-sharpness region, an iris diaphragm, and a casing, with the laminae of said iris diaphragm, fixed in said diaphragm ring, said iris diaphragm having a diaphragm-groove ring, said diaphragm-groove ring being rotatably mounted in said diaphragm ring and unrotatable in relation to said sliding member, the aperture of said iris diaphragm being altered and said objective undergoing an axial displacement on rotation of said diaphragm ring and the axial displacement of said objective and the alteration of the aperture of said iris diaphragm being so adjusted in relation to each other that the position of one boundary plane of the depth-sharpness region remains unaltered notwithstanding the alteration, thus produced, of the depth-sharpness region, said sliding member having a longitudinal slot at its rear end, a projection on said carrying ring and engaging in said slot and preventing the rotation of said sliding member on said carrying ring, a stud screwed radially into said diaphragm-groove ring, said diaphragm ring having a transverse slot on its periphery and said stud passing through said transverse slot and preventing said diaphragm-groove ring from rotating with said diaphragm ring, said distance ring having on its front end a conical surface bearing the distance scale, the rear end of said diaphragm-mark ring overlapping said conical surface and having a recess and, on one side of said recess, an edge which serves, on the distance scale, as an indicating mark for one boundary plane of the depth-sharpness region, said diaphragm ring having a widened front part and a rearwardly open annular groove in said widened front part and said diaphragm-mark ring lying in said annular groove, the outer wall of said annular groove having, on its rear edge that overlaps said distance-scale bearing conical surface on the front end of said distance ring, a recess on which the diaphragm scale is put and which is bounded on one side by an edge which serves as an indicating mark, on the distance scale, for the other boundary plane of the depth-sharpness region.

FRITZ HINDEN.

REFERENCES CITED

The following references are of record in the file of this patent:

UNITED STATES PATENTS

| Number | Name | Date |
|---|---|---|
| 1,848,402 | Wollensak | Mar. 8, 1932 |
| 2,026,724 | Wollensak | Jan. 7, 1936 |
| 2,279,476 | Mihalyi | Apr. 14, 1942 |
| 2,315,977 | Mihalyi | Apr. 6, 1943 |